US010195563B2

(12) United States Patent
Uramoto et al.

(10) Patent No.: US 10,195,563 B2
(45) Date of Patent: Feb. 5, 2019

(54) DEHUMIDIFICATION DEVICE

(71) Applicant: Sharp Kabushiki Kaisha, Sakai, Osaka (JP)

(72) Inventors: Yoshihiro Uramoto, Sakai (JP); Nobuki Sakikawa, Sakai (JP); Yasumasa Suzuki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 79 days.

(21) Appl. No.: 15/504,671

(22) PCT Filed: Aug. 13, 2015

(86) PCT No.: PCT/JP2015/072902
§ 371 (c)(1),
(2) Date: Feb. 17, 2017

(87) PCT Pub. No.: WO2016/056304
PCT Pub. Date: Apr. 14, 2016

(65) Prior Publication Data
US 2017/0282120 A1    Oct. 5, 2017

(30) Foreign Application Priority Data

Oct. 6, 2014    (JP) .................................. 2014-205973

(51) Int. Cl.
*B01D 53/26*        (2006.01)
*B01J 20/28*        (2006.01)
(Continued)

(52) U.S. Cl.
CPC ........... *B01D 53/261* (2013.01); *B01D 53/06* (2013.01); *B01J 20/28033* (2013.01);
(Continued)

(58) Field of Classification Search
CPC .. B01D 53/06; B01D 53/26; B01D 2253/202; B01D 2257/80; B01J 20/28033; F24F 3/1417; F24F 3/1423
(Continued)

(56) References Cited

U.S. PATENT DOCUMENTS 5,147,420 A * 9/1992 Claesson .............. B01D 53/261
95/113
6,526,674 B1 * 3/2003 Fielding ............. B01D 53/0446
34/130
(Continued)

FOREIGN PATENT DOCUMENTS

CN        101291718 A    10/2008
JP       2002-126442 A     5/2002
(Continued)

OTHER PUBLICATIONS

Official Communication issued in International Patent Application No. PCT/JP2015/072902, dated Oct. 6, 2015.

*Primary Examiner* — Frank M Lawrence, Jr.
(74) *Attorney, Agent, or Firm* — ScienBiziP, P.C.

(57) ABSTRACT

A dehumidifying device configured such that a dehumidifying material having absorbed moisture can efficiently release moisture. The dehumidifying device carries out dehumidification with a polymeric moisture-absorbing material that (i) exhibits hydrophilicity in a temperature range equal to or lower than a temperature sensitive point which is a given temperature and (ii) exhibits hydrophobicity in a temperature range higher than the temperature sensitive point. The dehumidifying device includes: a substrate to which the polymeric moisture-absorbing material is fixed; a heat generating member which heats, to the temperature range higher than the temperature sensitive point, the polymeric moisture-absorbing material that has absorbed moisture; and a moisture absorbing unit motor which rotates (Continued)

the substrate, so that the moisture, which has been absorbed by the polymeric moisture-absorbing material that is heated to the temperature range higher than the temperature sensitive point, is released as a waterdrop by a centrifugal force.

5 Claims, 12 Drawing Sheets

(51) Int. Cl.
*F24F 3/14* (2006.01)
*B01D 53/06* (2006.01)

(52) U.S. Cl.
CPC .......... *F24F 3/1417* (2013.01); *F24F 3/1423* (2013.01); *B01D 2253/202* (2013.01); *B01D 2257/80* (2013.01)

(58) Field of Classification Search
USPC ......... 95/113; 96/125–127, 146, 154; 34/80, 34/472, 473
See application file for complete search history.

(56) References Cited

U.S. PATENT DOCUMENTS

| | | | |
|---|---|---|---|
| 2017/0266605 A1* | 9/2017 | Uramoto | B01D 53/26 |
| 2017/0276380 A1* | 9/2017 | Sakikawa | B01J 20/24 |

FOREIGN PATENT DOCUMENTS

| | | | |
|---|---|---|---|
| JP | 2010-69428 A | | 4/2010 |
| WO | 2007/026023 A1 | | 3/2007 |
| WO | 2015/083732 A1 | | 6/2015 |

* cited by examiner

PRIOR ART

DEHUMIDIFICATION DEVICE

TECHNICAL FIELD

The present invention relates a dehumidifying device which employs a moisture-absorbing material.

BACKGROUND ART

As a commercialized desiccant dehumidifier, a dehumidifying device as disclosed in, for example, Patent Literature 1 has been conventionally known. A dehumidifying device 100 disclosed in Patent Literature 1 employs a moisture-absorbing material such as zeolite or silica gel. The moisture-absorbing material is applied to a filter member 101 which has a honeycomb shape and which has air permeability (see (a) and (b) of FIG. 12).

This type of moisture-absorbing material absorbs moisture in air in a case where a temperature of the moisture-absorbing material is equal to or lower than a given temperature, and releases absorbed moisture as water vapor in a case where the temperature of the moisture-absorbing material is higher than the given temperature. Therefore, the dehumidifying device 100, employing the moisture-absorbing material having such a property, has the following mechanism. That is, a fan 102 causes air in a room to pass through the filter member 101 so that the filter member 101 (i.e., the moisture-absorbing material) absorbs moisture in the air. On the other hand, in a case where absorbed moisture is taken out from the filter member 101, a rotating section 104 rotates the filter member 101 through 180 degrees so that a surface of the filter member 101 which surface has absorbed moisture faces a heater 103. The heater 103 then causes high-temperature wind to pass through the surface of the filter member 101, which surface has absorbed the moisture, so that the filter member 101 is heated up. This ultimately causes the moisture contained in the filter member 101 to be released as water vapor. Thereafter, a heat exchanger 105 causes high-temperature air, containing the water vapor, to be cooled down. This causes the moisture to be taken out in a tank 106. The dehumidifying device 100 thus dehumidifies air in a room.

As a conventional moisture-absorbing material, a dehumidifying and water-absorbing sheet as disclosed in, for example, Patent Literature 2 has been known. A dehumidifying and water-absorbing sheet disclosed in Patent Literature 2 includes (i) a gel sheet having a water-absorbing property which varies depending on a relationship between a temperature of the gel sheet and a temperature sensitive point and (ii) a sheet heater integrally adhered to the gel sheet. The gel sheet exhibits a high water-absorbing property in a case where the temperature of the gel sheet is equal to or lower than the temperature sensitive point, and exhibits a low water-absorbing property in a case where the temperature of the gel sheet is equal to or higher than the temperature sensitive point. Therefore, in a case where the gel sheet is heated to a temperature equal to or higher than the temperature sensitive point by the sheet heater, the gel sheet releases absorbed water and accordingly becomes able to absorb water again. This allows the gel sheet to be reused.

CITATION LIST

Patent Literature

[Patent Literature 1]
Japanese Patent Application Publication, Tokukai, No. 2010-69428 A (published on Apr. 2, 2010)
[Patent Literature 2]
Japanese Patent Application Publication, Tokukai, No. 2002-126442 A (published on May 8, 2002)

SUMMARY OF INVENTION

Technical Problem

However, the above conventional dehumidifying device has the following problems.

First, according to the dehumidifying device 100 disclosed in Patent Literature 1, a large amount of thermal energy is needed so that moisture which has been absorbed by the filter member 101 is released from the filter member 101. Meanwhile, air which has been heated up has to be cooled down with use of the heat exchanger 105 so that the moisture is converted into water. This causes the dehumidifying device 100 to be inefficient.

In regard to the dehumidifying and water-absorbing sheet disclosed in Patent Literature 2, a polymeric moisture-absorbing material can absorb moisture having a weight several ten times or more a weight of the polymeric moisture-absorbing material, in a case where the polymeric moisture-absorbing material is brought into direct contact with water. However, in a case of moisture in air, the polymeric moisture-absorbing material can only absorb the moisture having a weight equal to or less than the weight of the polymeric moisture-absorbing material. Therefore, there is a problem that, even in a case where the polymeric moisture-absorbing material which has absorbed moisture in air is heated to a temperature equal to a temperature sensitive point so that such absorbed moisture is released, a waterdrop remains attached to a surface of the moisture-absorbing material, and does not easily drop.

The present invention has been made in view of the above conventional problems, and an object of the present invention is to provide a dehumidifying device configured such that a dehumidifying material which has absorbed moisture can efficiently release the moisture.

Solution to Problem

In order to attain the above object, a dehumidifying device in accordance with an aspect of the present invention is a dehumidifying device which carries out dehumidification with use of a moisture-absorbing material that (i) exhibits hydrophilicity in a temperature range equal to or lower than a temperature sensitive point which is a given temperature and (ii) exhibits hydrophobicity in a temperature range higher than the temperature sensitive point, the dehumidifying device including: at least one base material to which the moisture-absorbing material is fixed; a heating section which heats, to the temperature range higher than the temperature sensitive point, the moisture-absorbing material that has absorbed moisture; and a rotating section which rotates the at least one base material, to which the moisture-absorbing material that is heated to the temperature range higher than the temperature sensitive point is fixed, so that the moisture, which has been absorbed by the moisture-absorbing material that is heated to the temperature range higher than the temperature sensitive point, is released as a waterdrop by a centrifugal force.

Advantageous Effects of Invention

According to an aspect of the present invention, it is possible to provide a dehumidifying device configured such that a dehumidifying material which has absorbed moisture can efficiently release the moisture.

Figure 3:
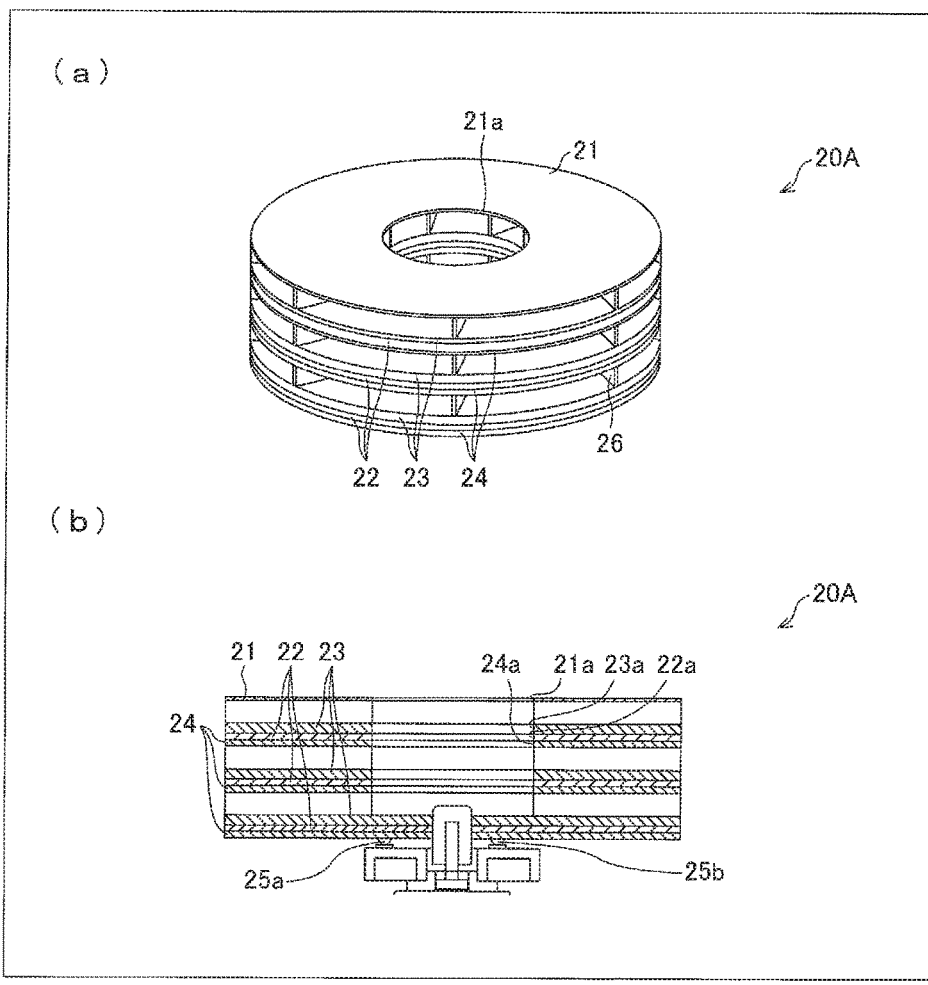

(a) of FIG. 3 is a perspective view illustrating a configuration of a moisture absorbing unit included in the dehumidifying device. (b) of FIG. 3 is a cross-sectional view illustrating the configuration of the moisture absorbing unit.

Figure 4:
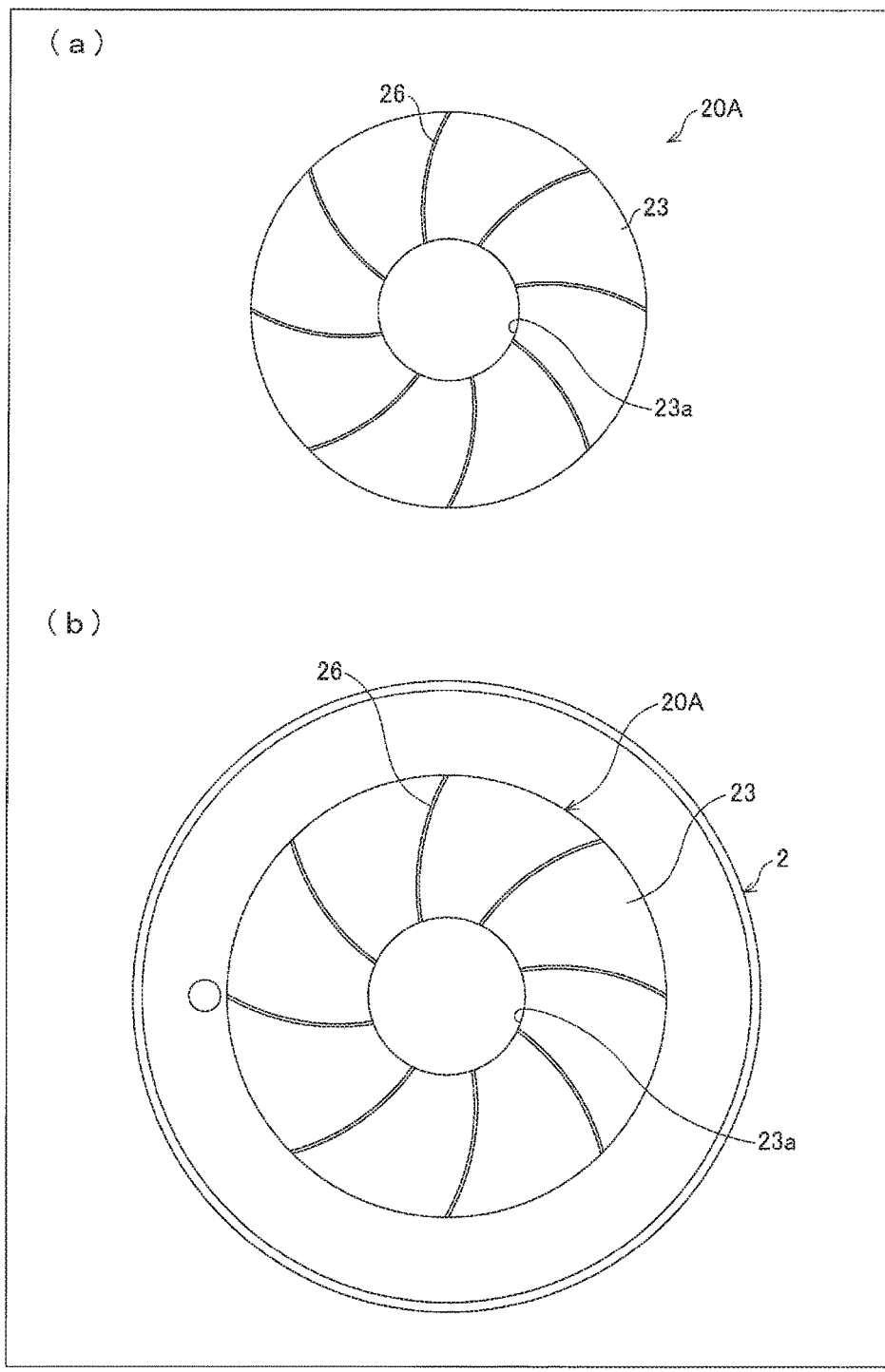

(a) of FIG. 4 is a plan view illustrating the configuration of the moisture absorbing unit included in the dehumidifying device, except for an upper plate. (b) of FIG. 4 is a plan view illustrating the dehumidifying device, except for (i) a grating provided on an upper surface of the dehumidifying device and (ii) the upper plate included in the moisture absorbing unit.

Figure 5:
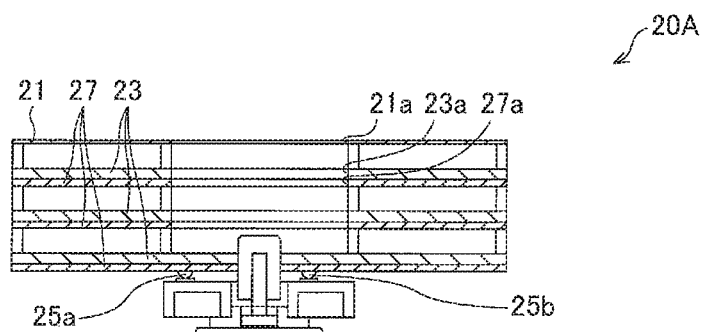

FIG. 5 is a cross-sectional view illustrating a variation of the moisture absorbing unit included in the dehumidifying device.

Figure 6:
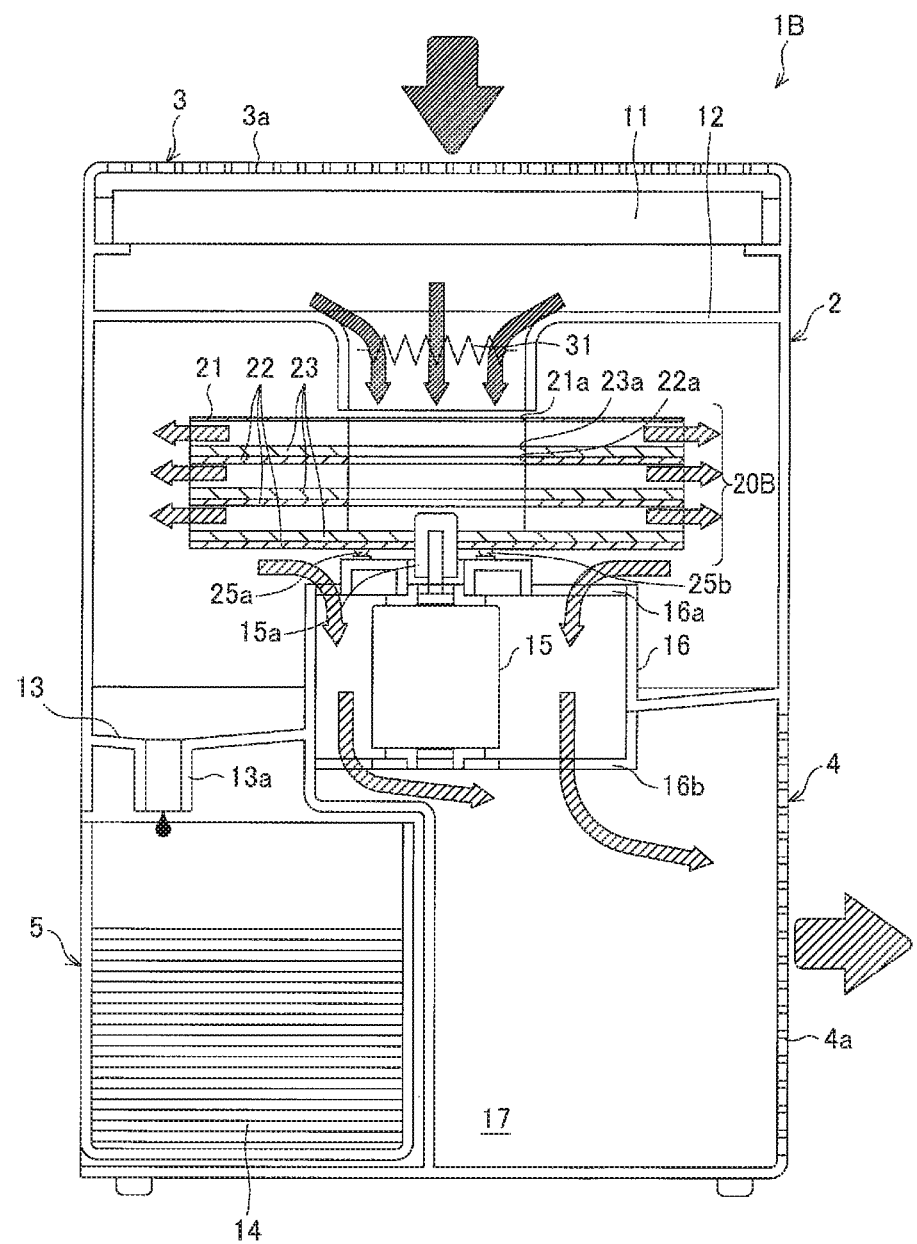

FIG. 6 is a cross-sectional view illustrating an internal structure of a dehumidifying device in accordance with Embodiment 2 of the present invention.

Figure 7:
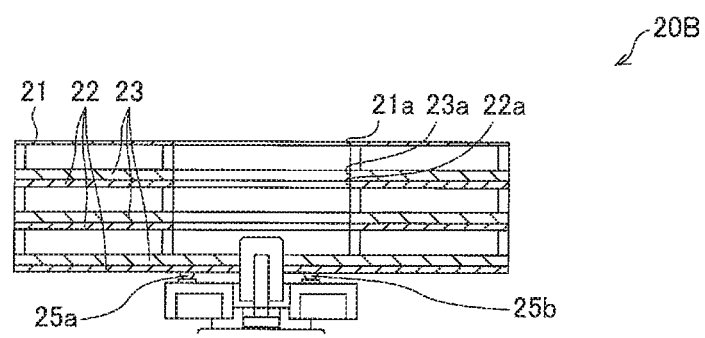

FIG. 7 is a cross-sectional view illustrating a configuration of a moisture absorbing unit included in the dehumidifying device.

Figure 8:
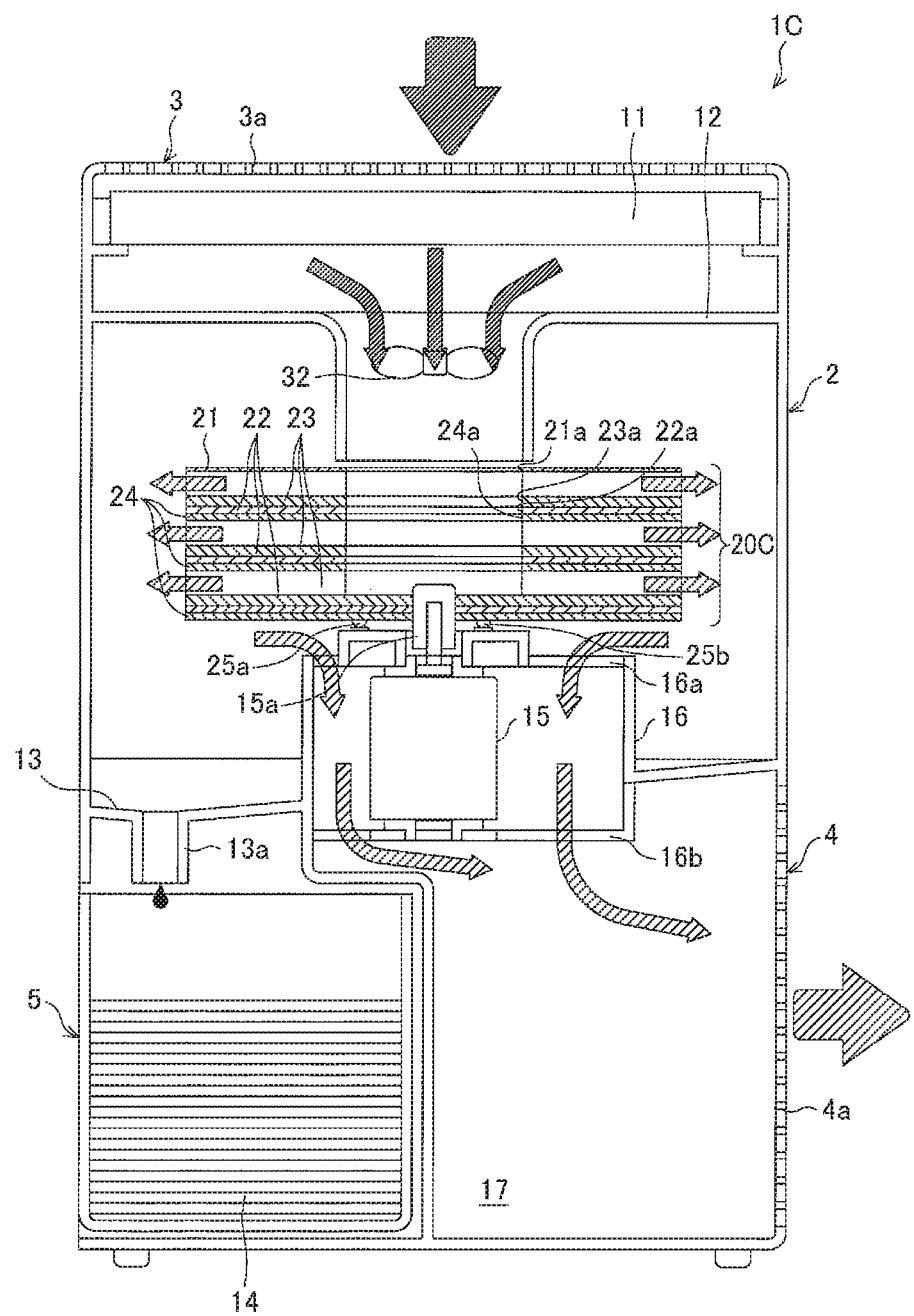

FIG. 8 is a cross-sectional view illustrating an internal structure of a dehumidifying device in accordance with Embodiment 3 of the present invention.

Figure 9:
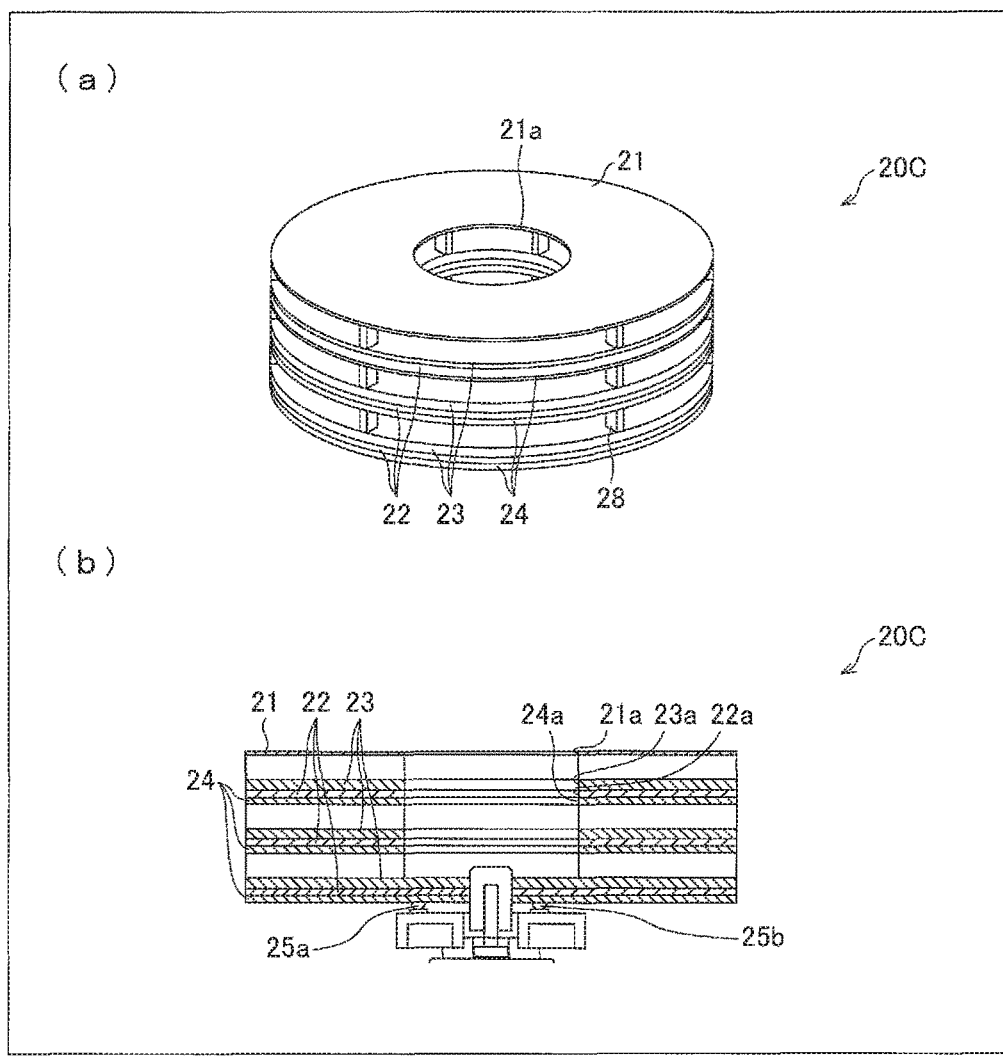

(a) of FIG. 9 is a perspective view illustrating a configuration of a moisture absorbing unit included in the dehumidifying device. (b) of FIG. 9 is a cross-sectional view illustrating the configuration of the moisture absorbing unit.

Figure 10:
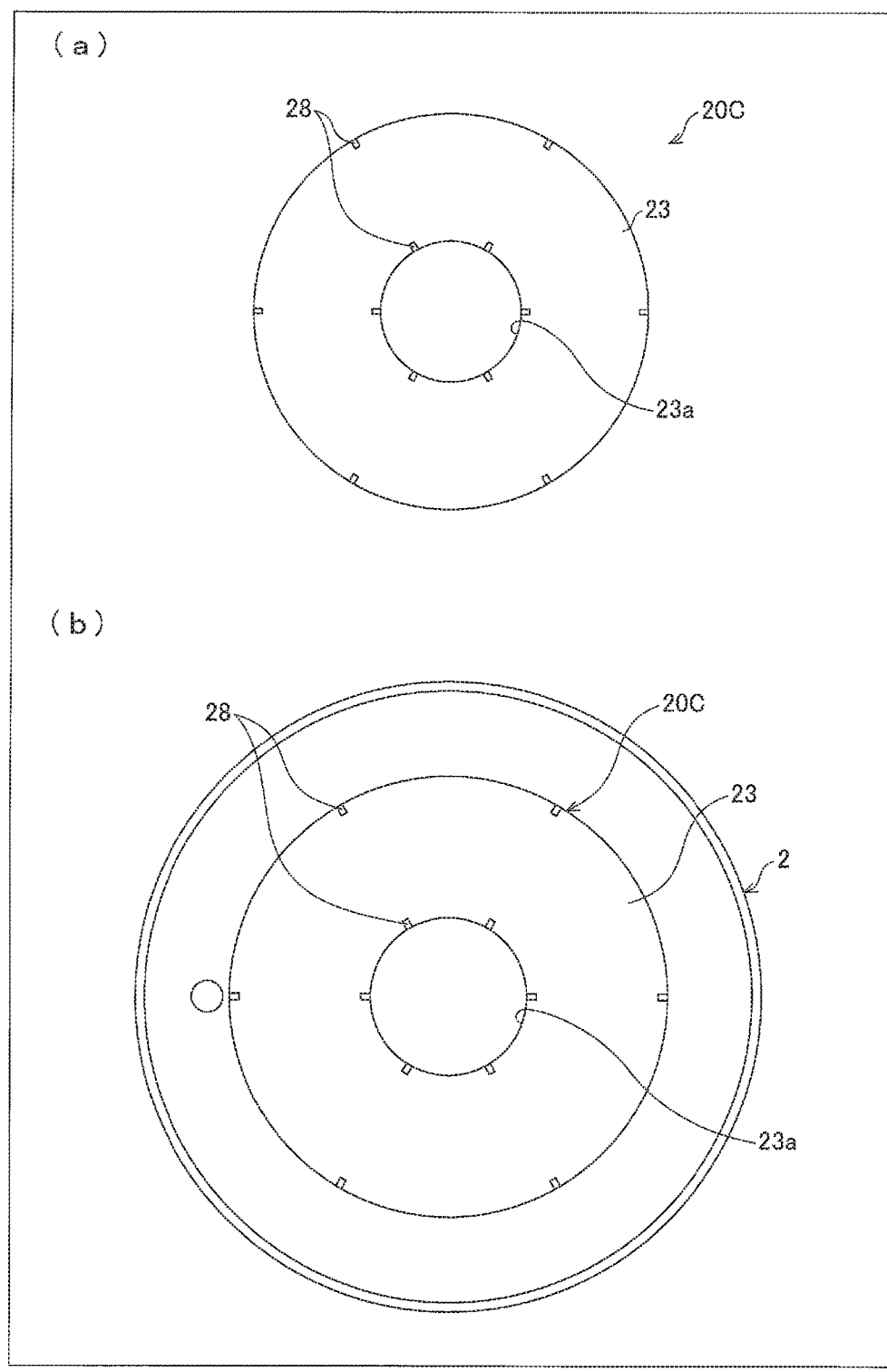

(a) of FIG. 10 is a plan view illustrating the configuration of the moisture absorbing unit included in the dehumidifying device, except for an upper plate. (b) of FIG. 10 is a plan view illustrating the dehumidifying device, except for (i) a grating provided on an upper surface of the dehumidifying device and (ii) the upper plate included in the moisture absorbing unit.

Figure 11:
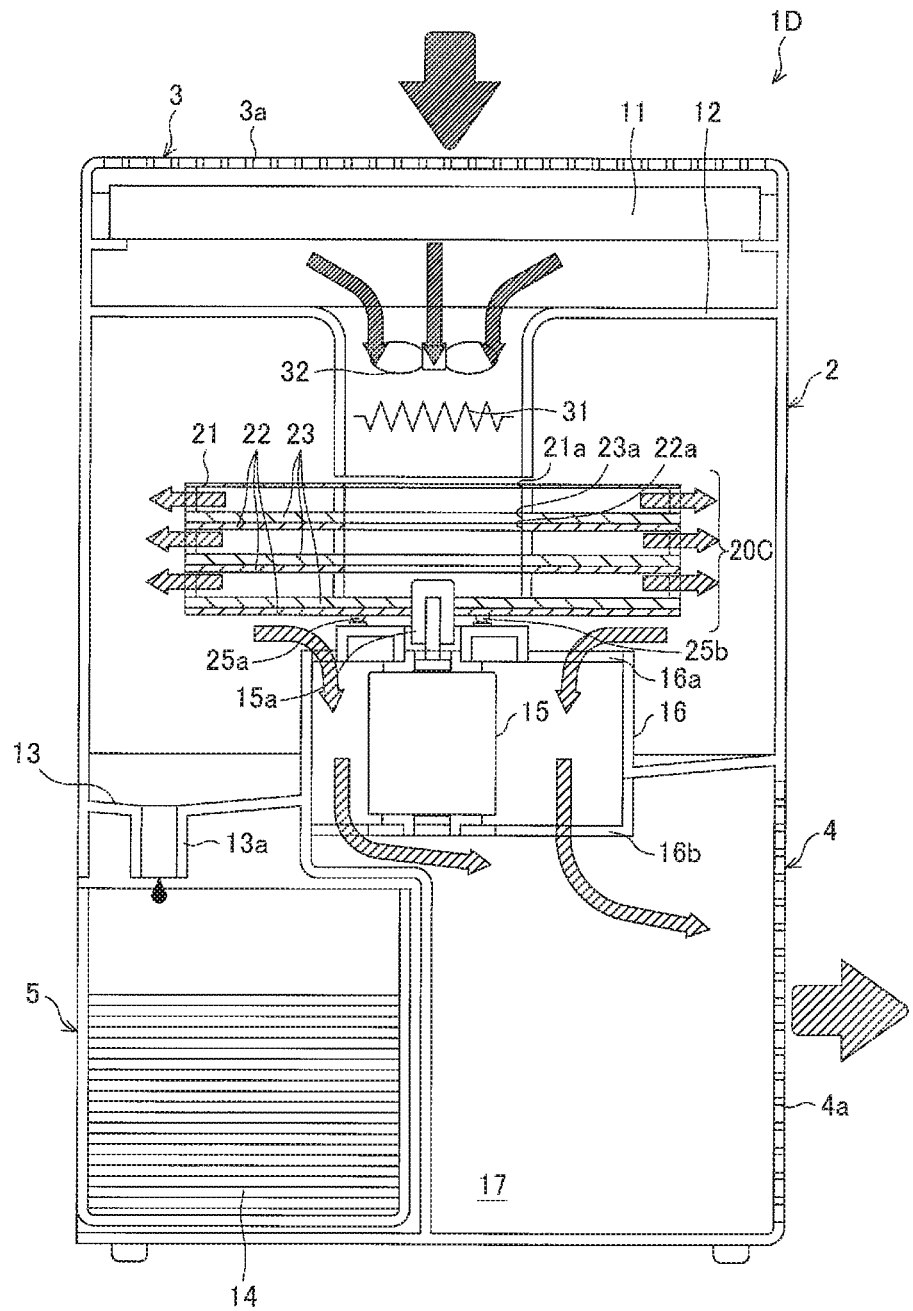

FIG. 11 is a cross-sectional view illustrating an internal structure of a dehumidifying device in accordance with Embodiment 4 of the present invention.

Figure 12:
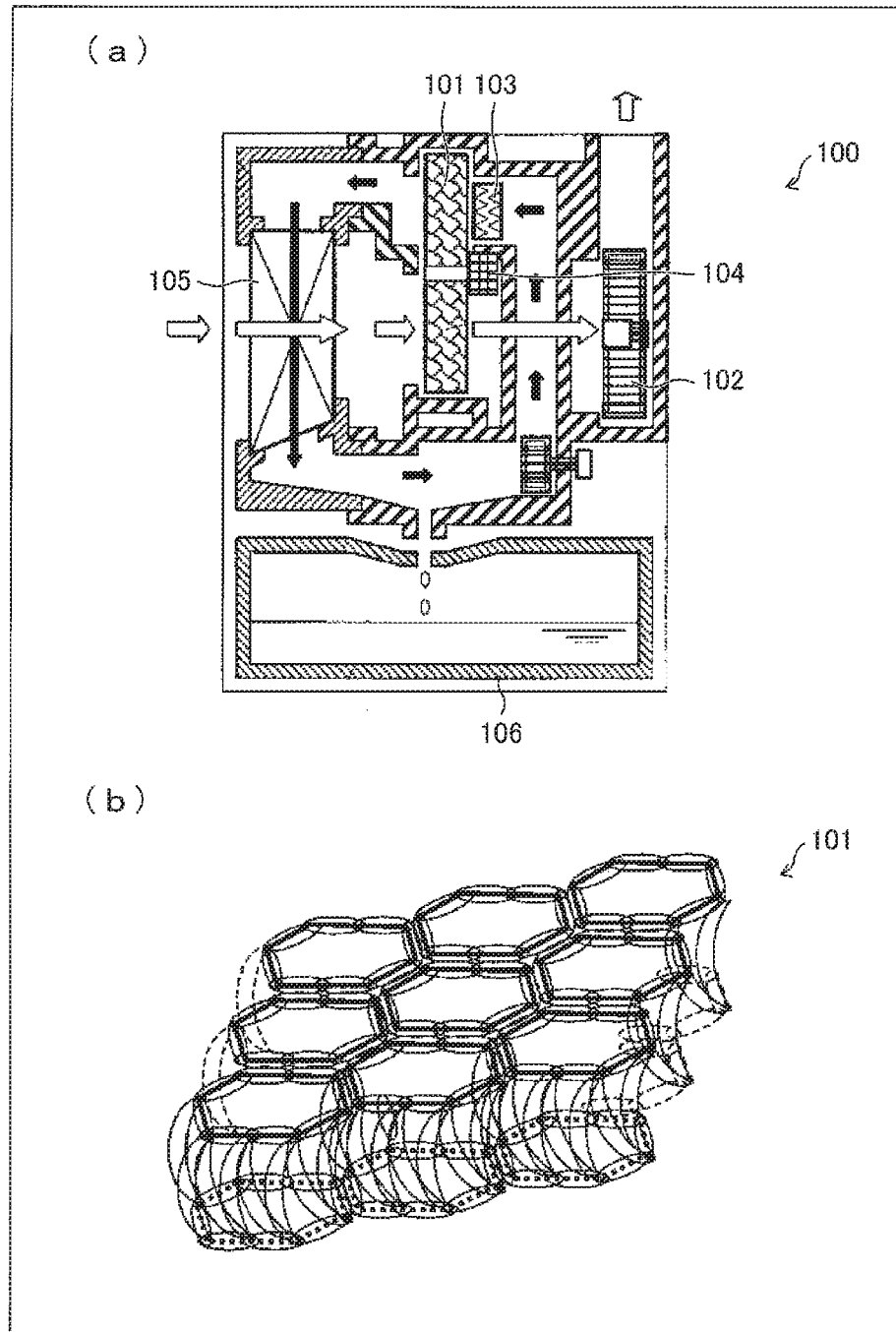

(a) of FIG. 12 is a cross-sectional view illustrating a configuration of a conventional dehumidifying device. (b) of FIG. 12 is a perspective view illustrating a configuration of a filter member which is included in the conventional dehumidifying device and which has a honeycomb shape.

DESCRIPTION OF EMBODIMENTS

Embodiment 1

The following description will discuss Embodiment 1 of the present invention with reference to FIGS. 1 through 5.

Figure 1:
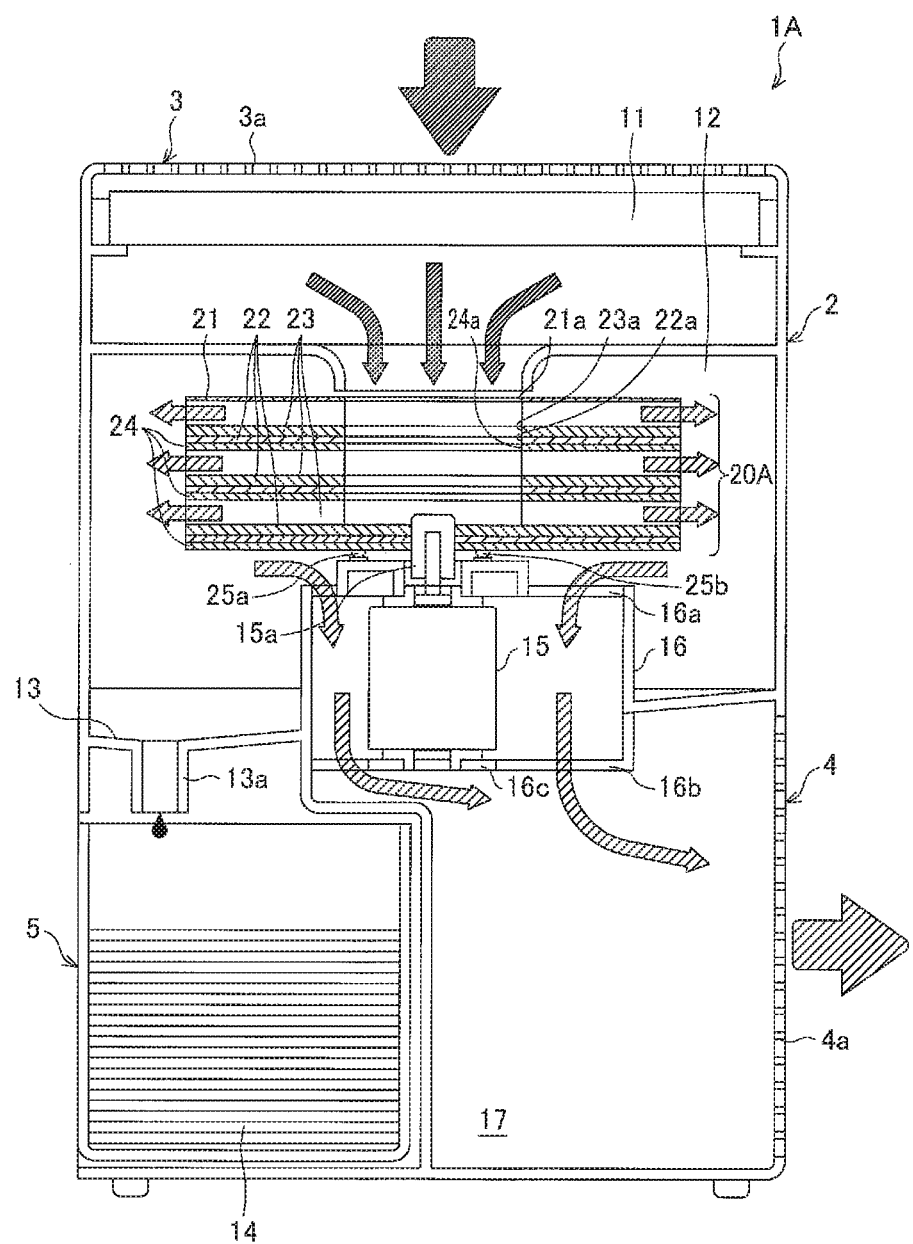
FIG. 1 is a cross-sectional view illustrating an internal structure of a dehumidifying device in accordance with Embodiment 1 of the present invention.
Figure 2:
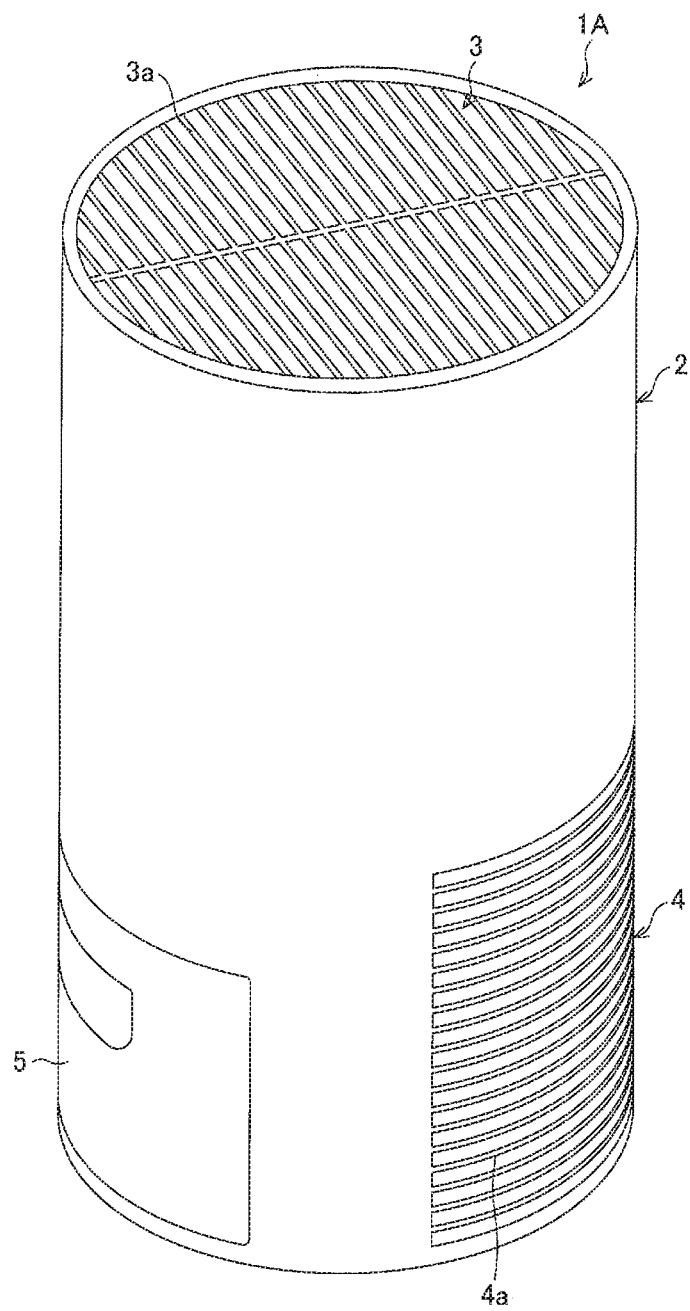
FIG. 2 is a perspective view illustrating an external structure of the dehumidifying device.

A configuration of a dehumidifying device in accordance with Embodiment 1 will be described below with reference to FIGS. 1 and 2. FIG. 1 is a cross-sectional view illustrating an internal structure of a dehumidifying device 1A in accordance with Embodiment 1. FIG. 2 is a perspective view illustrating an external structure of the dehumidifying device 1A.

As the external structure, the dehumidifying device 1A in accordance with Embodiment 1 includes a housing 2 having, for example, a cylindrical shape (see FIG. 2). The housing 2 includes (i) an air inlet 3 which is provided on an entire upper surface of the housing 2 and which has a grating 3a, (ii) an air outlet 4 which is provided in a lower front portion of a wall surface of the housing 2 and which has a grating 4a, and (iii) a door 5 which is provided on a lower back portion of the wall surface and which is opened so as to take out a water drain tank 14 (later described). The housing 2 is made of resin or metal. Note that the housing 2 is not limited to the cylindrical shape and can alternatively have a shape of, for example, a polygonal tube (such as a quadrangular tube) or an elliptic cylinder.

As the internal structure, the dehumidifying device 1A includes, in order from a top thereof, (i) the air inlet 3 having the grating 3a, (ii) an air filer 11, (iii) an air narrowing section 12, (iv) a moisture absorbing unit 20A, (v) a centrifuged water collected floor 13, (vi) the water drain tank 14 which receives water that has been centrifuged and collected on the centrifuged water collected floor 13, (vii) a moisture absorbing unit motor 15 which, as a rotating section, drives the moisture absorbing unit 20A so as to rotate, (viii) a motor supporting section 16 which supports the moisture absorbing unit motor 15 and which causes air to flow therethrough after centrifugal separation, (ix) an air flow chamber 17 which leads air to the air outlet 4, and (x) the air outlet 4 having the grating 4a (see FIG. 1).

The air inlet 3 is an inlet through which air in a room where the dehumidifying device 1A is provided is taken in the dehumidifying device 1A. According to Embodiment 1, the air inlet 3 is provided on the upper surface of the housing 2. However, the dehumidifying device 1A is not limited to such a configuration. The air inlet 3 can be alternatively provided on a side surface of the housing 2.

The air filter 11 is a filter which filters out, for example, a foreign matter, pollen, and dust in air that has been caused to flow in the dehumidifying device 1A. The air filter 11 is made of, for example, a non-woven fabric. Note that the air filter 11 can have a function of filtering out odor. Note also that the air filter 11 can have a function of collecting dust with use of ions.

The air narrowing section 12 is provided right above the moisture absorbing unit 20A. Specifically, according to Embodiment 1, the moisture absorbing unit 20A includes circular plates which are layered one above the other so as to be a layered plate and which are arranged such that the layered plate has an opening at its center (later described). Air in a room flows through the opening formed at the center of the layered plate. In this manner, air in a room flows in the moisture absorbing unit 20A. Therefore, the air narrowing section 12 is provided right above the moisture absorbing unit 20A so that air, which has been present in a room and then caused to flow in the dehumidifying device 1A through the air inlet 3, is efficiently caused to flow in the moisture absorbing unit 20A through such a central opening of the moisture absorbing unit 20A. The air narrowing section 12 has a diameter equal to that of an upper plate 21 which has an upper plate opening 21a and which has an annular shape. This causes all of moist air, having passed through the air narrowing section 12, to flow in the moisture absorbing unit 20A through the central opening of the moisture absorbing unit 20A.

The moisture absorbing unit 20A has a configuration characteristic of Embodiment 1. The moisture absorbing unit 20A absorbs moisture contained in air which has been caused to flow in the dehumidifying device 1A, and releases the moisture as a waterdrop by centrifugal separation. Note that the configuration of the moisture absorbing unit 20A will be later described in detail.

The centrifuged water collected floor 13 causes a waterdrop, having been released by the moisture absorbing unit 20A by centrifugal separation, to be collected on the centrifuged water collected floor 13 and be poured in the water drain tank 14, provided in a lower portion of the housing 2, through a water drain outlet 13a provided in a part of the centrifuged water collected floor 13. Therefore, the centrifuged water collected floor 13 is inclined so that the water drain outlet 13a is located at a lowermost position.

The moisture absorbing unit motor 15 drives the moisture absorbing unit 20A, which includes the circular plates layered one above the other, so as to rotate on respective centers of the circular plates. Therefore, the moisture absorbing unit motor 15 is provided so that a motor shaft 15a whose end is fixed to the moisture absorbing unit 20A is directed upward.

The motor supporting section 16 supports the moisture absorbing unit motor 15, and causes air to flow therethrough after centrifugal separation. Specifically, the motor supporting section 16 takes a form of a tube, and is provided substantially at the center of the centrifuged water collected floor 13. A bridge member 16c provided in the tube supports the moisture absorbing unit motor 15. The motor supporting section 16 has a dehumidified air flow-in opening 16a on its upper end, and has a dehumidified air flow-out opening 16b on its lower end. Therefore, air dehumidified by the moisture absorbing unit 20A passes through the dehumidified air flow-in opening 16a of the motor supporting section 16, then passes though the dehumidified air flow-out opening 16b of the motor supporting section 16, and is discharged through the air outlet 4, having the grating 4a, of the housing 2 via the air flow chamber 17.

Next, the configuration of the moisture absorbing unit 20A in accordance with Embodiment 1 will be described in detail with reference to (a) and (b) of FIG. 3 and (a) and (b) of FIG. 4. (a) of FIG. 3 is a perspective view illustrating the configuration of the moisture absorbing unit 20A in accordance with Embodiment 1. (b) of FIG. 3 is a cross-sectional view illustrating the configuration of the moisture absorbing unit 20A. (a) of FIG. 4 is a plan view illustrating the configuration of the moisture absorbing unit 20A in accordance with Embodiment 1, except for the upper plate 21. (b) of FIG. 4 is a plan view illustrating the dehumidifying device 1A, except for (i) the grating 3a provided on an upper surface of the dehumidifying device 1A and (ii) the upper plate 21 included in the moisture absorbing unit 20A.

As illustrated in (a) and (b) of FIG. 3, the moisture absorbing unit 20A in accordance with Embodiment 1 includes (i) substrates 22 (i.e., circular plates) each of which serves as a base material and the number of which is, for example, three and (ii) the upper plate 21. The substrates 22 and the upper plate 21 are layered so as to be spaced out. Note that, according to Embodiment 1, three substrates 22, each of which serves as a base material, are layered so as to be spaced out, but the number of the substrates 22 is not limited to any particular number.

Each of the substrates 22 is a flat annular plate, and is made of, for example, resin. Each of the substrates 22 has, at its center, a substrate opening 22a through which air flows. Note, however, that, according to the present invention, a material of the base material is not limited to resin, and can be alternatively metal or ceramic. Note also that the material of the base material can take a fibrous form. Furthermore, the base material preferably has high thermal conductivity. In addition, the base material is not limited to a flat circular plate, and can be a regular polygonal plate. This allows the moisture absorbing unit 20A to stably rotate in a balanced manner.

Each of the substrates 22 has an upper surface to which a polymeric moisture-absorbing material 23 is, for example, applied. The polymeric moisture-absorbing material 23 which is applied to each of the substrates 22 has a polymeric moisture-absorbing material opening 23a. The polymeric moisture-absorbing material 23 is made of a moisture-absorbing material which (i) exhibits hydrophilicity in a temperature range equal to or lower than a temperature sensitive point which is a given temperature and (ii) exhibits hydrophobicity in a temperature range higher than the temperature sensitive point. Accordingly, the polymeric moisture-absorbing material 23 (i) absorbs moisture, contained in air passing through the moisture absorbing unit 20A, in the temperature range equal to or lower than the temperature sensitive point, that is, in a temperature range of a dehumidification-target environment, which temperature range includes normal temperatures, and (ii) releases absorbed moisture as a waterdrop in the temperature range higher than the temperature sensitive point. Such a phenomenon is reversible. Therefore, by repeatedly causing a temperature change with respect to the moisture absorbent unit 20A, it is possible for the moisture absorbent unit 20A to repeat (i) absorption of moisture contained in air, which absorption is carried out at a normal temperature, and (ii) release of a waterdrop, which release is carried out by heating.

According to Embodiment 1, the temperature sensitive point is set to, for example, 50° C. Note, however, that the temperature sensitive point can be adjusted, as necessary, within a range of, for example, 40° C. to 60° C. by adjusting a material of the polymeric moisture-absorbing material 23. Therefore, heating the polymeric moisture-absorbing material 23 to a temperature slightly higher than a normal temperature causes the polymeric moisture-absorbing material 23 to have hydrophobicity.

According to Embodiment 1, the polymeric moisture-absorbing material 23 which has a desired property can be prepared as appropriate with use of a temperature sensitive polymer, such as (i) poly(N-isopropyl acrylamide) (PNIPAM) and a derivative thereof and (ii) polyvinyl ether and a derivative thereof, as the material of the polymeric moisture-absorbing material 23. By thus arranging the polymeric moisture-absorbing material 23, it is possible to easily achieve an arrangement in which the polymeric moisture-absorbing material 23 alternately switches between a hydrophilic state and a hydrophobic state by thermal stimulation, the hydrophilic state being a state in which the polymeric moisture-absorbing material 23 absorbs moisture, the hydrophobic state being a state in which the polymeric moisture-absorbing material 23 releases absorbed moisture.

Each of the substrates 22 has a lower surface to which a heat generating member 24 is, for example, adhered. The heat generating member 24 which is adhered to each of the substrates 22 has a heat generating member opening 24a at its center, and has an annular shape. This allows the polymeric moisture-absorbing material 23 to be heated via the each of the substrates 22. The heat generating member 24 is connected to sliding electrodes 25a and 25b each of which is slidable (see FIG. 1). This causes the heat generating member 24 to be supplied with electric power.

According to Embodiment 1, the moisture absorbing unit 20A is configured as follows. That is, the upper plate 21, which has the upper plate opening 21a and has an annular shape, is provided above the three substrates 22, each of which has an annular shape. The lowermost one of the three substrates 22 is a circular plate having no substrate opening 22a. Accordingly, the polymeric moisture-absorbing material 23 which is applied to the lowermost one of the three substrates 22 is also a circular plate having no polymeric moisture-absorbing material opening 23a, and the heat generating member 24 which is adhered to the lowermost one of the three substrates 22 is also a circular plate having no generating member opening 24a. As a result, moist air passes inside the moisture absorbing unit 20A.

Further, according to Embodiment 1, ribs 26 are radially provided between the upper plate 21 and the uppermost one of the three substrates 22 and between adjacent ones of the three substrates 22. The ribs 26 functions as a fan member, and also functions as a spacer for causing (i) the upper plate 21 and the uppermost one of the three substrates 22 to be spaced out and (ii) the adjacent ones of the three substrates 22 to be spaced out. The ribs 26 are provided so as to swirl in a multi-layered way as illustrated in (a) and (b) of FIG. 4. This causes the ribs 26 to function as a so-called centrifugal fan. Therefore, rotating the moisture absorbing unit 20A causes the ribs 26 to lead, to an outer periphery of the moisture absorbing unit 20A, air in the center of the moisture absorbing unit 20A.

How the dehumidifying device 1A, having the above configuration, in accordance with Embodiment 1 is used will be described below.

As illustrated in FIG. 1, the dehumidifying device 1A is operated as follows. That is, an electric power supply (not illustrated) of the moisture absorbing unit motor 15 is turned on in a state where an electric power supply (not illustrated) of the heat generating member 24 included in the moisture absorbing unit 20A is turned off. This causes the moisture absorbing unit 20A to rotate. Such rotation of the moisture absorbing unit 20A causes air outside the dehumidifying device 1A to flow in the dehumidifying device 1A through the air inlet 3. Such outside air is narrowed by the air narrowing section 12, and is caused to flow in a central portion of the moisture absorbing unit 20A through the upper plate opening 21a of the upper plate 21, having an annular shape, included in the moisture absorbing unit 20A.

The outside air which has flowed inside the moisture absorbing unit 20A flows toward the outer periphery of the moisture absorbing unit 20A from the central portion of the moisture absorbing unit 20A through (i) a space between the upper plate 21 and the uppermost one of the three substrates 22, which uppermost one has the upper surface to which the polymeric moisture-absorbing material 23 is applied, and (ii) a space between the adjacent ones of the three substrates 22, each of which adjacent ones has the lower surface to which the heat generating member 24 is adhered. In so doing, the polymeric moisture-absorbing material 23 absorbs moisture contained in the outside air. As a result, moist air which has passed through the dehumidifying device 1A becomes dry air, and is discharged outside the dehumidifying device 1A through the air outlet 4 of the housing 2.

Next, after it is estimated that the moisture has been sufficiently stored in the polymeric moisture-absorbing material 23 included in the moisture absorbing unit 20A of the dehumidifying device 1A, the electric power supply of the heat generating member 24 adhered to the lower surface of each of the substrates 22 is turned on, and the electric power supply of the moisture absorbing unit motor 15 is turned on. Note that it is automatically estimated with use of, for example, a timer that moisture is sufficiently stored in the polymeric moisture-absorbing material 23.

This causes the polymeric moisture-absorbing material 23 to (i) be heated to a temperature equal to or higher than the temperature sensitive point and (ii) accordingly exhibit hydrophobicity, so that the moisture, which has been contained in the outside air and then absorbed, is released as condensed water, that is, a waterdrop. Specifically, water seeps out. In so doing, since the polymeric moisture-absorbing material 23 is rotated, the condensed water on the polymeric moisture-absorbing material 23 is flown toward an outer periphery of the polymeric moisture-absorbing material 23 by a centrifugal force, hits against an inner wall surface of the housing 2, and then drops onto the centrifuged water collected floor 13.

Here, since the centrifuged water collected floor 13 is inclined so that the water drain outlet 13a is located at the lowermost position, the condensed water which has dropped on the centrifuged water collected floor 13 flows to the water drain outlet 13a, and drops to the water drain tank 14 through the water drain outlet 13a. The condensed water collected in the water drain tank 14 can be discarded after the door 5 of the housing 2 is opened and then the water drain tank 14 is taken out from the housing 2.

As such, the dehumidifying device 1A in accordance with Embodiment 1 carries out dehumidification with use of the polymeric moisture-absorbing material 23 (moisture-absorbing material) that (i) exhibits hydrophilicity in a temperature range equal to or lower than a temperature sensitive point which is a given temperature and (ii) exhibits hydrophobicity in a temperature range higher than the temperature sensitive point. The dehumidifying device 1A includes: the substrates 22 (base material) to each of which the polymeric moisture-absorbing material 23 is fixed; the heat generating member 24 (heating section) which heats, to the temperature range higher than the temperature sensitive point, the polymeric moisture-absorbing material 23 that has absorbed moisture; and the moisture absorbing unit motor 15 (rotating section) which rotates the substrates 22 (base material), to each of which the polymeric moisture-absorbing material 23 that is heated to the temperature range higher than the temperature sensitive point is fixed, so that the moisture, which has been absorbed by the polymeric moisture-absorbing material 23 that is heated to the temperature range higher than the temperature sensitive point, is released as a waterdrop by a centrifugal force. Note that, according to Embodiment 1, as a way of fixing the polymeric moisture-absorbing material 23 to the base material, an example in which the polymeric moisture-absorbing material 23 is applied to the base material is described. However, according to the present invention, the way of fixing the polymeric moisture-absorbing material 23 to the base material is not limited to such an example. Alternatively, the polymeric moisture-absorbing material 23 can be adhered to a fibrous base material in a state where the polymeric moisture-absorbing material 23 is dispersed in the fibrous base material. Alternatively, the polymeric moisture-absorbing material 23 can be mechanically fixed to the base material with use of a pin, a frame, or the like. Alternatively, an adsorbent which is solidified so as to have foam (including a large bubble having a size of several millimeters to 1 (one) cm so that moisture having seeped out can easily leave the absorbent) can be adhered to a flat plate shaped base material.

According to the above configuration, the dehumidifying device 1A carries out dehumidification with use of the polymeric moisture-absorbing material 23 that (i) exhibits hydrophilicity in a temperature range equal to or lower than a temperature sensitive point which is a given temperature and (ii) exhibits hydrophobicity in a temperature range higher than the temperature sensitive point. Therefore, by heating the polymeric moisture-absorbing material 23, having absorbed moisture in air, to the temperature range higher than the temperature sensitive point with use of the heat generating member 24, the moisture, which has been contained in the air and then absorbed by the polymeric moisture-absorbing material 23, is brought into a state where the moisture can be released as condensed water.

According to a conventional desiccant method and the like, it is general to heat zeolite or a polymeric moisture-absorbing material, each corresponding to the polymeric moisture-absorbing material 23, at a high temperature until water absorbed by the zeolite or the polymeric moisture-absorbing material turns a water vapor, in order to remove the water from the zeolite or the polymeric moisture-absorbing material (in order to reuse the zeolite or the polymeric moisture-absorbing material). Then, air which has been heated up is cooled down with use of a heat exchanger so that the water vapor turns water. Therefore, such conventional desiccant method and the like are inefficient.

Meanwhile, the dehumidifying device 1A in accordance with Embodiment 1 includes: the substrates 22 to each of which the polymeric moisture-absorbing material 23 is fixed; the heat generating member 24 which heats, to the temperature range higher than the temperature sensitive point, the polymeric moisture-absorbing material 23 that has absorbed moisture; and the moisture absorbing unit motor 15 which rotates the substrates 22, to each of which the polymeric moisture-absorbing material 23 that is heated to the temperature range higher than the temperature sensitive point is fixed, so that the moisture, which has been absorbed by the polymeric moisture-absorbing material 23 that is heated to the temperature range higher than the temperature sensitive point, is released as a waterdrop by a centrifugal force.

By heating the polymeric moisture-absorbing material 23, having absorbed moisture in air, to the temperature range higher than the temperature sensitive point with use of the heat generating member 24, the moisture, which has been contained in the air and then absorbed, is caused to be condensed water, that is, a waterdrop. The polymeric moisture-absorbing material 23 is rotated in a state where the polymeric moisture-absorbing material 23 has thereon the condensed water, that is, the waterdrop.

This causes the waterdrop thus released to be flown outside the outer periphery of the polymeric moisture-absorbing material 23 by a centrifugal force. By collecting the waterdrop thus flown, it is possible to easily discharge, outside the polymeric moisture-absorbing material 23, the moisture which has been contained in the air and then absorbed by the polymeric moisture-absorbing material 23.

Therefore, it is possible to provide a dehumidifying device 1A configured such that the polymeric moisture-absorbing material 23 which has absorbed moisture can efficiently release the moisture.

Further, the dehumidifying device 1A in accordance with Embodiment 1 includes the ribs 26 (fan member) which cause air outside the dehumidifying device 1A to flow in the dehumidifying device 1A, the ribs 26 being provided to each of the substrates 22. Therefore, in a case where the moisture absorbing unit motor 15 rotates the substrates 22, the ribs 26, provided to each of the substrates 22, is capable of causing air outside the dehumidifying device 1A to flow inside the dehumidifying device 1A.

Accordingly, it is not necessary to further provide an air blowing fan for causing air outside the dehumidifying device 1A to flow inside the dehumidifying device 1A. This allows (i) a reduction in number of components, (ii) a reduction in energy consumption, and (iii) a reduction in size of the dehumidifying device 1A.

Further, according to the dehumidifying device 1A in accordance with Embodiment 1, the heat generating member 24 is provided to each of the substrates 22. This allows the polymeric moisture-absorbing material 23 to be efficiently heated.

Further, according to the dehumidifying device 1A in accordance with Embodiment 1, each of the substrates 22 is a circular plate or a regular polygonal plate. This allows the substrates 22 to rotate in a balanced manner.

Further, according to the dehumidifying device 1A in accordance with Embodiment 1, the substrates 22 are layered so as to be spaced out. This allows the dehumidifying device 1A to include two or more polymeric moisture-absorbing materials 23. Since this results in an increase in moisture absorption area of the polymeric moisture-absorbing materials 23, it is possible to shorten time taken to absorb moisture, and ultimately possible to shorten time taken to dehumidify air in a room.

Note that the present invention is not limited to the description of Embodiment 1, but may be altered within the scope of the present invention. For example, according to Embodiment 1, the heat generating member 24 is a member different from each of the substrates 22. However, the present invention is not limited to such a configuration. For example, the heat generating member 24 which is originally integrated with each of the substrates 22 can be alternatively used. Specifically, as illustrated in FIG. 5, a heat generating member combined substrate 27 which is a substrate constituted by a heat generating member can be alternatively used. This allows a reduction in number of the components.

According to Embodiment 1, as described above, the heat generating member combined substrate 27 which is a base material can also serve as a heat generating member. This also allows the polymeric moisture-absorbing material 23 to be efficiently heated.

Embodiment 2

The following description will discuss Embodiment 2 of the present invention with reference to FIGS. 6 and 7. Note that arrangements which are not described in Embodiment 2 are identical to those described in Embodiment 1. Note also that, for convenience, members having functions identical to those of the respective members illustrated in the drawings of Embodiment 1 will be given respective identical reference numerals, and descriptions of the members will be omitted.

According to the dehumidifying device 1A in accordance with Embodiment 1, the heat generating member 24 is adhered to the lower surface of each of the substrates 22 so as to be integrated with the each of the substrates 22.

In contrast, according to a dehumidifying device 1B in accordance with Embodiment 2, a heat generating member 24 is separately provided. The dehumidifying device 1B is different from the dehumidifying device 1A in this point.

A configuration of the dehumidifying device 1B in accordance with Embodiment 2 will be described below with reference to FIGS. 6 and 7. FIG. 6 is a cross-sectional view illustrating an internal structure of the dehumidifying device 1B in accordance with Embodiment 2. FIG. 7 is a cross-sectional view illustrating a configuration of a moisture absorbing unit 20B included in the dehumidifying device 1B.

As illustrated in FIG. 6, the dehumidifying device 1B in accordance with Embodiment 2 includes a heat generating member 31 which heats a polymeric moisture-absorbing material 23. The heat generating member 31 is provided to an air narrowing section 12 in a tensioned state.

According to Embodiment 2, the heat generating member 31 is made of a coiled nichrome wire, and is connected to an electric power supply (not illustrated). Therefore, by turning on/off the electric power supply, the polymeric moisture-absorbing material 23 is caused to switch between a heated state and a non-heated state.

As such, the moisture absorbing unit 20B in accordance with Embodiment 2 is configured such that (i) the polymeric moisture-absorbing material 23 is merely applied to an upper surface of each of substrates 22 and (ii) a heat generating member 24, which is present in the moisture absorbing unit 20A in accordance with Embodiment 1, is not present on a lower surface of each of the substrates 22 (see FIG. 7).

How the dehumidifying device 1B, having the above configuration, in accordance with Embodiment 2 is used will be described below.

As illustrated in FIG. 6, the dehumidifying device 1B is first operated as follows. That is, an electric power supply (not illustrated) of a moisture absorbing unit motor 15 is turned on in a state where the electric power supply (not illustrated) of the heat generating member 31 of the moisture absorbing unit 20B is turned off. This causes the moisture absorbing unit 20B to rotate. Such rotation of the moisture absorbing unit 20B causes air outside the dehumidifying device 1B to flow in the dehumidifying device 1B through an air inlet 3. Such outside air is narrowed by the air narrowing section 12, and is caused to flow in the moisture absorbing unit 20B through an upper plate opening 21a of an upper plate 21, having an annular shape, included in the moisture absorbing unit 20B.

The outside air which has flowed inside the moisture absorbing unit 20B flows toward an outer periphery of the moisture absorbing unit 20B from a central portion of the moisture absorbing unit 20B through (i) a space between the upper plate 21 and an uppermost one of the substrates 22, which uppermost one has the upper surface to which the polymeric moisture-absorbing material 23 is applied, and (ii) a space between adjacent ones of the substrates 22. In so doing, the polymeric moisture-absorbing material 23 absorbs moisture contained in the outside air. As a result, moist air which has passed through the dehumidifying device 1B becomes dry air, and is discharged outside the dehumidifying device 1B through an air outlet 4 of a housing 2.

Next, after it is estimated that the moisture has been sufficiently stored in the polymeric moisture-absorbing material 23 included in the moisture absorbing unit 20B of the dehumidifying device 1B, the electric power supply of the heat generating member 31, which is provided to the air narrowing section 12 in a tensioned state, is turned on, and the electric power supply of the moisture absorbing unit motor 15 is turned on. As a result, moist air, heated by the heat generating member 31, flows inside the moisture absorbing unit 20B, and the polymeric moisture-absorbing material 23 is accordingly heated to a temperature equal to or higher than a temperature sensitive point.

This causes the polymeric moisture-absorbing material 23 to exhibit hydrophobicity, so that the moisture, which has been contained in the outside air and then absorbed, seeps out and is then released as condensed water, that is, a waterdrop. In so doing, since the polymeric moisture-absorbing material 23 is rotated, the condensed water on the polymeric moisture-absorbing material 23 is flown toward an outer periphery of the polymeric moisture-absorbing material 23 by a centrifugal force, hits against an inner wall surface of the housing 2, and then drops onto a centrifuged water collected floor 13.

Here, since the centrifuged water collected floor 13 is inclined so that a water drain outlet 13a is located at a lowermost position, the condensed water which has dropped on the centrifuged water collected floor 13 flows to the water drain outlet 13a, and drops to a water drain tank 14 through the water drain outlet 13a. The condensed water collected in the water drain tank 14 can be discarded after a door 5 of the housing 2 is opened and then the water drain tank 14 is taken out from the housing 2.

According to the dehumidifying device 1B in accordance with Embodiment 2, as described above, the heat generating member 31, which heats the polymeric moisture-absorbing material 23, is provided to the air narrowing section 12 in a tensioned state. This makes it possible to simplify a configuration of a heating section.

Embodiment 3

The following description will discuss Embodiment 3 of the present invention with reference to FIGS. 8 through 10. Note that arrangements which are not described in Embodiment 3 are identical to those described in Embodiments 1 and 2. Note also that, for convenience, members having functions identical to those of the respective members illustrated in the drawings of Embodiments 1 and 2 will be given respective identical reference numerals, and descriptions of the members will be omitted.

According to the dehumidifying device 1A in accordance with Embodiment 1, the ribs 26, which function as a centrifugal fan and which, in a case where the moisture absorbing unit 20A is rotated, cause air outside the dehumidifying device 1A to flow inside the moisture absorbing unit 20A, are provided between adjacent ones of the substrates 22 as spacers. Instead, according to a dehumidifying device 1C in accordance with Embodiment 3, an air blowing fan is separately provided. The dehumidifying device 1C is different from the dehumidifying device 1A in this point.

A configuration of the dehumidifying device 1C in accordance with Embodiment 3 will be described below with reference to FIGS. 8 through 10. FIG. 8 is a cross-sectional view illustrating an internal structure of the dehumidifying device 1C in accordance with Embodiment 3. (a) of FIG. 9 is a perspective view illustrating a configuration of a moisture absorbing unit 20C included in the dehumidifying device 1C. (b) of FIG. 9 is a cross-sectional view illustrating the configuration of the moisture absorbing unit 20C. (a) of FIG. 10 is a plan view illustrating the configuration of the moisture absorbing unit 20C included in the dehumidifying device 1C, except for an upper plate 21. (b) of FIG. 10 is a plan view illustrating the dehumidifying device 1C, except for (i) a grating 3a provided on an upper surface of the dehumidifying device 1C and (ii) the upper plate 21 included in the moisture absorbing unit 20C.

As illustrated in FIG. 8, the dehumidifying device 1C in accordance with Embodiment 3 includes an air blowing fan 32 which is provided to an air narrowing section 12.

According to Embodiment 3, the air blowing fan 32 is used so as to cause moist air to flow in the moisture absorbing unit 20C. Therefore, the moisture absorbing unit 20C in accordance with Embodiment 3 is configured such that ribs 28 which do not function as a centrifugal fan and which merely function as spacers are provided instead of the ribs 26 which are present in the moisture absorbing unit 20A of Embodiment 1 and which function as a centrifugal fan (see (a) and (b) of FIG. 9). The ribs 28 are provided along each of an inner periphery and an outer periphery of the moisture absorbing unit 20C so as to be scattered (see (a) and (b) of FIG. 10). Accordingly, the ribs 28 do not have a function of sending moist air, having been caused to flow in a central portion of the moisture absorbing unit 20C, toward the outer periphery of the moisture absorbing unit 20C.

How the dehumidifying device 1C, having the above configuration, in accordance with Embodiment 3 is used will be described below.

As illustrated in FIG. 8, the dehumidifying device 1C is first operated as follows. That is, the air blowing fan 32 is turned on in a state where an electric power supply (not illustrated) of a heat generating member 24 included in the moisture absorbing unit 20C is turned off. This causes air outside the dehumidifying device 1C to flow in the dehumidifying device 1C through an air inlet 3. Such outside air is narrowed by the air narrowing section 12, and is caused to flow in the central portion of the moisture absorbing unit 20C through an upper plate opening 21a of the upper plate 21, having an annular shape, included in the moisture absorbing unit 20C. The outside air which has flowed inside the moisture absorbing unit 20C flows toward the outer periphery of the moisture absorbing unit 20C from the central portion of the moisture absorbing unit 20C through (i) a space between the upper plate 21 and an uppermost one of substrates 22, which uppermost one has an upper surface to which a polymeric moisture-absorbing material 23 is applied, and (ii) a space between adjacent ones of the substrates 22, each of which adjacent ones has a lower surface to which the heat generating member 24 is adhered. In so doing, the polymeric moisture-absorbing material 23 absorbs moisture contained in the outside air.

As a result, moist air which has passed through the dehumidifying device 1C becomes dry air, and is discharged outside the dehumidifying device 1C through an air outlet 4 of a housing 2.

Next, after it is estimated that the moisture has been sufficiently stored in the polymeric moisture-absorbing material 23 included in the moisture absorbing unit 20C of the dehumidifying device 1C, the electric power supply of the heat generating member 24 adhered to the lower surface of each of the substrates 22 is turned on, and an electric power supply of a moisture absorbing unit motor 15 is turned on. This causes the polymeric moisture-absorbing material 23 to (i) be heated to a temperature equal to or higher than a temperature sensitive point and (ii) accordingly exhibit hydrophobicity, so that the moisture, which has been contained in the outside air and then absorbed, seeps out as condensed water, that is, a waterdrop. In so doing, since the polymeric moisture-absorbing material 23 is rotated, the condensed water on the polymeric moisture-absorbing material 23 is flown toward an outer periphery of the polymeric moisture-absorbing material 23 by a centrifugal force, hits against an inner wall surface of the housing 2, and then drops onto a centrifuged water collected floor 13. Note that the moisture absorbing unit motor 15 can be always turned on, regardless of whether the electric power supply of the heat generating member 24 is turned on or off.

Here, since the centrifuged water collected floor 13 is inclined so that a water drain outlet 13a is located at a lowermost position, the condensed water which has dropped on the centrifuged water collected floor 13 flows to the water drain outlet 13a, and drops to a water drain tank 14 through the water drain outlet 13a. The condensed water collected in the water drain tank 14 can be discarded after a door 5 of the housing 2 is opened and then the water drain tank 14 is taken out from the housing 2.

According to the dehumidifying device 1C in accordance with Embodiment 3, as described above, the air blowing fan 32 is provided to the air narrowing section 12 separately from the moisture absorbing unit 20C. As such, by providing the moisture absorbing unit 20C in accordance with Embodiment 3 to a dehumidifying device including a general air blowing fan 32, it is possible to easily apply the moisture absorbing unit 20C in accordance with Embodiment 3 to such a conventional dehumidifying device.

Embodiment 4

The following description will discuss Embodiment 4 of the present invention with reference to FIG. 11. Note that arrangements which are not described in Embodiment 4 are identical to those described in Embodiments 1 through 3. Note also that, for convenience, members having functions identical to those of the respective members illustrated in the drawings of Embodiments 1 through 3 will be given respective identical reference numerals, and descriptions of the members will be omitted.

As illustrated in FIG. 11, a dehumidifying device 1D in accordance with Embodiment 4 is different from the dehumidifying devices 1A through 1C in that the dehumidifying device 1D has such a configuration that the configuration of the dehumidifying device 1B in accordance with Embodiment 2 is combined with that of the dehumidifying device 1C in accordance with Embodiment 3.

The configuration of the dehumidifying device 1D in accordance with Embodiment 4 will be described below with reference to FIG. 11. FIG. 11 is a cross-sectional view illustrating an internal structure of the dehumidifying device 1D in accordance with Embodiment 4.

As illustrated in FIG. 11, the dehumidifying device 1D in accordance with Embodiment 4 includes (i) a heat generating member 31 (heating section) which is made of a coiled nichrome wire and which is provided to an air narrowing section 12 and (ii) an air blowing fan 32 which causes moist air to flow in a moisture absorbing unit 20C and which is provided to the air narrowing section 12.

Accordingly, a configuration of the moisture absorbing unit 20C is identical to that of the moisture absorbing unit 20C which is described in Embodiment 3 and which includes the ribs 28 that do not have a function of sending air.

How the dehumidifying device 1D, having the above configuration, in accordance with Embodiment 4 is used will be described below.

As illustrated in FIG. 11, the dehumidifying device 1C is first operated as follows. That is, the air blowing fan 32 is turned on in a state where an electric power supply (not illustrated) of the heat generating member 31, which is included in the moisture absorbing unit 20C and which is made of a nichrome wire, is turned off. This causes air outside the dehumidifying device 1C to flow in the dehumidifying device 1C through an air inlet 3. Such outside air is narrowed by the air narrowing section 12, and is caused to flow in a central portion of the moisture absorbing unit 20C through an upper plate opening 21a of the upper plate 21, having an annular shape, included in the moisture absorbing unit 20C.

The outside air which has flowed inside the moisture absorbing unit 20C flows toward an outer periphery of the moisture absorbing unit 20C from the central portion of the moisture absorbing unit 20C through (i) a space between the upper plate 21 and an uppermost one of substrates 22, which uppermost one has an upper surface to which a polymeric moisture-absorbing material 23 is applied, and (ii) a space between adjacent ones of the substrates 22, each of which adjacent ones has a lower surface to which a heat generating member 24 is adhered. In so doing, the polymeric moisture-absorbing material 23 absorbs moisture contained in the outside air. As a result, moist air which has passed through the dehumidifying device 1D becomes dry air, and is discharged outside the dehumidifying device 1D through an air outlet 4 of a housing 2.

Next, after it is estimated that the moisture has been sufficiently stored in the polymeric moisture-absorbing material 23 included in the moisture absorbing unit 20C of the dehumidifying device 1C, the electric power supply of the heat generating member 31, which is provided to the air narrowing section 12 and which is made of a nichrome wire, is turned on, and an electric power supply of a moisture absorbing unit motor 15 is turned on. This causes the polymeric moisture-absorbing material 23 to (i) be heated to a temperature equal to or higher than a temperature sensitive point and (ii) accordingly exhibit hydrophobicity, so that the moisture, which has been contained in the outside air and then absorbed, seeps out as condensed water, that is, a waterdrop. In so doing, since the polymeric moisture-absorbing material 23 is rotated, the condensed water on the polymeric moisture-absorbing material 23 is flown toward an outer periphery of the polymeric moisture-absorbing material 23 by a centrifugal force, hits against an inner wall surface of the housing 2, and then drops onto a centrifuged water collected floor 13. Note that the moisture absorbing unit motor 15 can be always turned on, regardless of whether the electric power supply of the heat generating member 24 is turned on or off Here, since the centrifuged water collected floor 13 is inclined so that a water drain outlet 13a is located at a lowermost position, the condensed water which has dropped on the centrifuged water collected floor 13 flows to the water drain outlet 13a, and drops to a water drain tank 14 through the water drain outlet 13a. The condensed water collected in the water drain tank 14 can be discarded after a door 5 of the housing 2 is opened and then the water drain tank 14 is taken out from the housing 2.

According to the dehumidifying device 1D in accordance with Embodiment 4, as described above, the heat generating member 31, which heats the polymeric moisture-absorbing material 23, is provided to the air narrowing section 12 in a tensioned state, and the air blowing fan 32 is provided to the air narrowing section 12. That is, the heat generating member 31 and the air blowing fan 32 are provided separately from the moisture absorbing unit 20C.

This makes it possible to simplify a configuration of a heating section. Furthermore, by providing the moisture absorbing unit 20C in accordance with Embodiment 4 to a dehumidifying device including a general air blowing fan 32, it is possible to easily apply the moisture absorbing unit 20C in accordance with Embodiment 4 to such a conventional dehumidifying device.

SUMMARY

The dehumidifying device 1A, 1B, 1C, 1D in accordance with a first aspect of the present invention is a dehumidifying device which carries out dehumidification with use of a moisture-absorbing material (polymeric moisture-absorbing material 23) that (i) exhibits hydrophilicity in a temperature range equal to or lower than a temperature sensitive point which is a given temperature and (ii) exhibits hydrophobicity in a temperature range higher than the temperature sensitive point, the dehumidifying device including: at least one base material (substrate 22, heat generating member combined substrate 27) to which the moisture-absorbing material (polymeric moisture-absorbing material 23) is fixed; a heating section (heat generating member 24, heat generating member 31) which heats, to the temperature range higher than the temperature sensitive point, the moisture-absorbing material (polymeric moisture-absorbing material 23) that has absorbed moisture; and a rotating section 8 (moisture absorbing unit motor 15) which rotates the at least one base material (substrate 22, heat generating member combined substrate 27), to which the moisture-absorbing material (polymeric moisture-absorbing material 23) that is heated to the temperature range higher than the temperature sensitive point is fixed, so that the moisture, which has been absorbed by the moisture-absorbing material (polymeric moisture-absorbing material 23) that is heated to the temperature range higher than the temperature sensitive point, is released as a waterdrop by a centrifugal force.

According to the above invention, by heating the moisture-absorbing material, having absorbed moisture in air, to the temperature range higher than the temperature sensitive point with use of the heating section, the moisture, which has been contained in the air and then absorbed, is caused to seep out as condensed water, that is, a waterdrop. The moisture-absorbing material is rotated in a state where the moisture-absorbing material has thereon the condensed water, that is, the waterdrop.

This causes the waterdrop to be flown outside an outer periphery of the moisture-absorbing material by a centrifugal force. By collecting the waterdrop thus flown, it is possible to easily discharge, outside the moisture-absorbing material, the moisture which has been contained in the air and then absorbed by the moisture-absorbing material.

Therefore, it is possible to provide a dehumidifying device configured such that a dehumidifying material which has absorbed moisture can efficiently release the moisture.

The dehumidifying device 1A, 1B in accordance with a second aspect of the present invention can be arranged so as to, in the first aspect, further include a fan member (rib 26) which causes air outside the dehumidifying device to flow in the dehumidifying device, the fan member being provided to the at least one base material (substrate 22, heat generating member combined substrate 27).

Therefore, in a case where the rotating section rotates the at least one base material, the fan member, provided to the at least one base material, is capable of causing air outside the dehumidifying device to flow inside the dehumidifying device.

According to an aspect of the present invention, since the dehumidifying device includes the rotating section, which rotates the at least one base material, it is possible to, with use of the rotating section, cause air outside the dehumidifying device to flow in the dehumidifying device.

Accordingly, it is not necessary to further provide an air blowing fan for causing air outside the dehumidifying device to flow inside the dehumidifying device. This allows (i) a reduction in number of components, (ii) a reduction in energy consumption, and (iii) a reduction in size of the dehumidifying device.

The dehumidifying device 1A, 1C in accordance with a third aspect of the present invention can be arranged such that, in the first or second aspect, the heating section (heat generating member 24, heat generating member combined substrate 27) is provided to the at least one base material (substrate 22) or the at least one base material itself is constituted by a heat generating member (heat generating member combined substrate 27).

According to the above configuration, the heating section, which heats the moisture-absorbing material to the temperature range higher than the temperature sensitive point, is provided to the at least one base material. Alternatively, the at least one base material itself is made of the heat generating member. This allows the moisture-absorbing material to be efficiently heated.

The dehumidifying device 1A, 1B, 1C, 1D in accordance with a fourth aspect of the present invention is preferably arranged such that, in the first, second, or third aspect, the at least one base material (substrate 22, heat generating member combined substrate 27) is a circular plate or a regular polygonal plate.

According to the above configuration, the at least one base material is a circular plate or a regular polygonal plate. This allows the at least one base material to rotate in a balanced manner.

The dehumidifying device 1A, 1B, 1C, 1D in accordance with a fifth aspect of the present invention is preferably arranged such that: in any one of the first through fourth aspects, the at least one base material (substrate 22, heat generating member combined substrate 27) includes a plurality of base materials; and the plurality of base materials are layered so as to be spaced out.

This allows the dehumidifying device to include two or more moisture-absorbing materials. Since this results in an increase in moisture absorption area of the moisture-absorbing materials, it is possible to shorten time taken to absorb moisture, and ultimately possible to shorten time taken to dehumidify air in a room.

The present invention is not limited to the description of the embodiments, but may be altered within the scope of the claims. An embodiment derived from a proper combination of technical means disclosed in different embodiments is also encompassed in the technical scope of the present invention.

INDUSTRIAL APPLICABILITY

The present invention is applicable to a dehumidifying device, a deodorizing machine, an air cleaner, or an air conditioning apparatus each of which employs a moisture-absorbing material.

REFERENCE SIGNS LIST

1A Dehumidifying device
1B Dehumidifying device
1C Dehumidifying device
1D Dehumidifying device
2 Housing
3 Air inlet
3a Grating
4 Air outlet
4a Grating
11 Air filter
13 Centrifuged water collected floor
13a Water drain outlet
14 Water drain tank
15 Moisture absorbing unit motor (rotating section)
15a Motor shaft
16 Motor supporting section
16a Dehumidified air flow-in opening
16b Dehumidified air flow-out opening
16c Bridge member
17 Air flow chamber
20A Moisture absorbing unit
20B Moisture absorbing unit
20C Moisture absorbing unit
21 Upper plate
21a Upper plate opening
22 Substrate (base material)
22a Substrate opening
23 Polymeric moisture-absorbing material
23a Polymeric moisture-absorbing material opening
24 Heat generating member (heating section)
24a Heat generating member opening
25a, 25b Sliding electrode
26 Rib (fan member)
27 Heat generating member combined substrate (base material) (heating section)
28 Rib
31 Heat generating member
32 Air blowing fan

The invention claimed is:

1. A dehumidifying device which carries out dehumidification with use of a moisture-absorbing material that (i) exhibits hydrophilicity in a temperature range equal to or lower than a temperature sensitive point which is a given temperature and (ii) exhibits hydrophobicity in a temperature range higher than the temperature sensitive point, the dehumidifying device comprising:
at least one base material to which the moisture-absorbing material is fixed;
a heating section which heats, to the temperature range higher than the temperature sensitive point, the moisture-absorbing material that has absorbed moisture; and
a rotating section which rotates the at least one base material, to which the moisture-absorbing material that is heated to the temperature range higher than the temperature sensitive point is fixed, so that the moisture, which has been absorbed by the moisture-absorbing material that is heated to the temperature range higher than the temperature sensitive point, is released as a waterdrop by a centrifugal force.

2. The dehumidifying device as set forth in claim 1, further comprising:
a fan member which causes air outside the dehumidifying device to flow in the dehumidifying device, the fan member being provided to the at least one base material.

3. The dehumidifying device as set forth in claim 1, wherein the heating section is provided to the at least one base material or the at least one base material itself is constituted by a heat generating member.

4. The dehumidifying device as set forth in claim 1, wherein the at least one base material is a circular plate or a regular polygonal plate.

5. The dehumidifying device as set forth in claim 1, wherein:
- the at least one base material includes a plurality of base materials; and
- the plurality of base materials are layered so as to be spaced out.

* * * * *